United States Patent
Danov et al.

(10) Patent No.: US 10,246,947 B2
(45) Date of Patent: Apr. 2, 2019

(54) MECHANICAL-LOAD BEARING AND ELECTRICALLY ISOLATING MECHANICAL CONNECTION

(71) Applicant: SIEMENS AKTIENGESELLSCHAFT, München (DE)

(72) Inventors: Vladimir Danov, Erlangen (DE); Andreas Koch, Neunkirchen am Brand (DE); Manfred Wohlfart, Wiesenthau (DE)

(73) Assignee: SIEMENS AKTIENGESELLSCHAFT, München (DE)

( * ) Notice: Subject to any disclaimer, the term of this patent is extended or adjusted under 35 U.S.C. 154(b) by 797 days.

(21) Appl. No.: 14/881,712

(22) Filed: Oct. 13, 2015

(65) Prior Publication Data
US 2016/0102503 A1    Apr. 14, 2016

(30) Foreign Application Priority Data

Oct. 13, 2014    (DE) .................. 10 2014 220 709

(51) Int. Cl.
*H01B 17/26*    (2006.01)
*E21B 17/02*    (2006.01)
(Continued)

(52) U.S. Cl.
CPC ........ *E21B 17/028* (2013.01); *E21B 43/2401* (2013.01); *F16B 7/18* (2013.01);
(Continued)

(58) Field of Classification Search
CPC .......... H01G 2/106; H01G 4/224; H01G 4/28; H01G 4/30; H01C 7/12; F16B 7/18; E21B 17/028; E21B 43/2401
(Continued)

(56) References Cited

U.S. PATENT DOCUMENTS 2,388,141 A * 10/1945 Harrington .............. G01V 3/24
175/50
4,348,672 A * 9/1982 Givler ................... E21B 17/003
175/320
(Continued)

FOREIGN PATENT DOCUMENTS

CN    202384179 U    8/2012
DE    28 56 896       7/1980
(Continued)

OTHER PUBLICATIONS

German Search Report dated Jun. 25, 2015 in corresponding German patent application No. 10 2014 220 709.6.
(Continued)

*Primary Examiner* — Angel R Estrada
(74) *Attorney, Agent, or Firm* — Slayden Grubert Beard PLLC

(57) ABSTRACT

A hollow body composed of an electrically conducting material and extending longitudinally along an axis is connected at one axial end to a connection element composed of an electrically conducting material and extending along the axis. A first thread is provided on the hollow body at the one axial end running about the axis, while a second thread is provided on the connection element running about the axis, so that the second thread is mechanically supported by the first thread. An insulation-material extent between the first thread and the second thread electrically isolates the hollow body from the connection element.

22 Claims, 3 Drawing Sheets

(51) Int. Cl.
    *H01G 4/28* (2006.01)
    *H01G 4/30* (2006.01)
    *H01G 2/10* (2006.01)
    *H01G 4/224* (2006.01)
    *E21B 43/24* (2006.01)
    *F16B 7/18* (2006.01)
    *H01C 7/12* (2006.01)

(52) U.S. Cl.
    CPC ............ *H01G 2/106* (2013.01); *H01G 4/224* (2013.01); *H01G 4/28* (2013.01); *H01G 4/30* (2013.01); *H01C 7/12* (2013.01)

(58) Field of Classification Search
    USPC ........ 174/142, 50, 520, 68.1, 68.3; 285/333, 285/149.1
    See application file for complete search history.

(56) References Cited

U.S. PATENT DOCUMENTS

| | | | |
|---|---|---|---|
| 4,496,174 | A | 1/1985 | McDonald et al. |
| 4,962,440 | A | 10/1990 | Johnnerfelt et al. |
| 5,138,313 | A | 8/1992 | Barrington |
| 6,098,727 | A | 8/2000 | Ringgenberg et al. |
| 6,112,808 | A | 9/2000 | Isted |
| 6,160,492 | A | 12/2000 | Herman |
| 7,900,968 | B2 * | 3/2011 | Camwell ............... E21B 17/028 285/333 |
| 9,777,538 | B2 * | 10/2017 | McGarian ............. E21B 17/003 |
| 2004/0206410 | A1 | 10/2004 | Extrand |
| 2005/0285706 | A1 | 12/2005 | Hall et al. |
| 2009/0097207 | A1 | 4/2009 | Gough |
| 2014/0043115 | A1 | 2/2014 | Wright et al. |
| 2014/0224472 | A1 | 8/2014 | Parsche |
| 2014/0265304 | A1 | 9/2014 | MacDonald et al. |
| 2014/0326444 | A1 | 11/2014 | Diehl ............................. 166/60 |
| 2015/0213954 | A1 | 7/2015 | Matz et al. |
| 2015/0279571 | A1 | 10/2015 | Diehl |

FOREIGN PATENT DOCUMENTS

| | | | |
|---|---|---|---|
| DE | 10 2012 217 168 A1 | 4/2014 | |
| DE | 10 2012 223 559 A1 | 5/2014 | |
| DE | 10 2014 200 347 A1 | 7/2015 | |
| EP | 2 048 928 A2 | 4/2009 | |
| FR | 939.232 | 11/1948 | |
| FR | 1115560 | 4/1956 | |
| RU | 2455796 C2 | 7/2012 | ............... H05B 6/02 |

OTHER PUBLICATIONS

European Search Report dated Mar. 7, 2016 in corresponding European patent application No. 15187988.9.
Russian Office Action, Application No. 2015143023/07, 12 pages, dated Feb. 27, 2017.

* cited by examiner

MECHANICAL-LOAD BEARING AND ELECTRICALLY ISOLATING MECHANICAL CONNECTION

CROSS REFERENCE TO RELATED APPLICATIONS

This application is based on and hereby claims priority to German Application No. 10 2014 220 709.6 filed on Oct. 13, 2014, the contents of which are hereby incorporated by reference.

BACKGROUND

Various methods are conventional in oil sand production. The first method is the so-called "mining". The soil containing the oil sand is excavated and processed. This method may be applied for depths up to approx. 50 m. This method is not relevant in the context of the embodiments described herein.

A further method is the so-called "steam assisted gravity drainage" method. According to this method, steam is forced into an oil sand reservoir. The steam flows through gaps and openings in the reservoir, is condensed, and thus heats the reservoir. This method is energy intensive and requires a lot of water.

A further method is the so-called "inductive heating". This method is currently researched with more intensity. In order to achieve uniform distribution of heat in the reservoir, the reservoir is heated by induction. That is to say that the heat is not discharged by thermal conduction of a cable but by eddy currents which are generated with the aid of high frequency. Several inventions have been made in the context of this method in the past. The method may likewise be combined with the "steam assisted gravity drainage" method. In order for the eddy currents to be generated, a loop made of a conducting material is installed in the ground, wherein an electric current may then flow by way of the loop.

Moreover, capacitors also have to be installed in order to produce an oscillating circuit. This means that the loop is interrupted at specific intervals by capacitors. There are currently two solutions which are targeted: a heat link-up is performed by means of a cable loop having capacitances installed therein, this being referred to as an inductor cable. According to a second design embodiment, the electric current is directed via tubes which are interrupted by capacitor assemblies. This here is referred to as a so-called tubular inductor.

SUMMARY

The embodiments described herein relate to a mechanical-load bearing and electrically isolating mechanical connection. The embodiments described herein relate particularly to a technical solution to a problem relating to an inductor housing of an inductive heating for oil sand production.

The embodiments described herein relate particularly to the capacitor assemblies in a tubular inductor. Capacitor assemblies are in particular capacitances which are connected in series or in parallel, and which are accommodated in a hollow body, in particular a hollow cylinder, as a housing. A housing of this type has two tasks. On the one hand, it has to protect the installed capacitances from all mechanical forces that arise, and on the other hand no current must flow via housings of this type, since the capacitances will otherwise be electrically shorted.

DE 10 2014 200347.4 is known to the inventors as describing a capacitor, in particular a construction for a power cable having a plurality of capacitors, a coaxial cable, and/or a resonance-type heating output. Described therein is a capacitor device previously composed of a single cylinder that is replaced by a plurality of cylindrical capacitors which are connected in parallel and which have a comparatively small diameter, with or without interdisposing a large tube which is centrically arranged and optionally may also represent a cylindrical capacitor. Each individual cylinder may be of identical construction, for example. Each individual cylinder may be electrically contacted by way of the two end faces thereof, for example, and thus be suitable for installation in series in a powered electrical conductor, for example a cable and/or a conductive tube.

DE 10 2012 217 168.1 is known to the inventors as describing a method for manufacturing a capacitor. Described therein is a capacitor for a power cable, a coaxial cable, and/or a resonance-type heating output. A manufacturing method is described suitable for mass production of a capacitor, in particular a cylindrical capacitor. Here, a basic body is alternatingly coated by thermal spraying and/or spraying with dielectric and electrically conducting layers and then sintered. In contrast to the related art, a high variability in design in terms of capacitance and avalanche voltage and resistance to temperature results on account thereof.

The embodiments described herein provide a mechanical connection which transmits high forces and acts in an electrically isolating manner. A connection of this type should withstand temperatures up to approx. 250° C., depending on the application. Known materials such as rubber or polyvinyl chloride (PVC) cannot be used. The object according to the various embodiments has in the context of development work relating in particular to inductive heating for oil sand. No standard solutions to this object are known at this end.

The embodiments described herein relate to a mechanical-load bearing and electrically isolating mechanical connection.

The embodiments described herein relate to a mechanical-load bearing and electrically isolating mechanical connection of a hollow body, in particular a hollow cylinder, which is composed of an electrically conducting material and extends longitudinally along an axis, having a connection element which is composed of an electrically conducting material and extends along the axis, wherein at one axial end of the elongate hollow body a first thread, which is produced so as to run about the axis thereon, mechanically supports a second thread, which is produced so as to run about the axis on the connection element, and an insulation-material extent which is fixed between the first and the second thread lends additional mechanical support and electrically isolates the hollow body from the connection element.

Due to use of the first and of the second thread, tensile forces on the connection element may be converted to compression forces on the threads.

The mechanical-load bearing and electrically isolating mechanical connection thus acts in an electrically isolating manner and may transmit high mechanical forces. Moreover, the insulation-material extent may be produced as one piece. A connection of this type may be disassembled and reassembled at will. The connection according to the various embodiments is an isolating connection which may transmit high mechanical forces. A connection of this type may be applied in particular for inductive heating of oil sand. In principle, further arbitrary applications are possible. Component parts which are comparatively easy to manufacture may be used in a particularly advantageous manner for the connection. The component parts may be releasable. Minor partial discharges may be ignored when ceramics are used as a material.

"Mechanical-load bearing" here means in particular that axially acting tensile forces and/or compression forces may be absorbed and withstood. A component which is "mechanical-load bearing" is indestructible by actually arising and axially acting tensile forces and/or compression forces. Axially acting tensile forces and/or compression forces may correspond to 2 to 5 t, for example, and specifically act on inductor housings of inductive heating installations for oil sand production.

Axial and radial here refers to the axis A of a hollow body which may be an inductor housing, for example, and which extends longitudinally along the axis A, or along a radius of the axis A, respectively.

The embodiments described herein relate to a mechanical-load bearing and electrically isolating mechanical connection, in which the connection fixes in each case one connection element to an axial end of a hollow body which extends longitudinally along an axis in such a manner that the connection in terms of axial compression forces and/or tensile forces remains mechanically stable and that the hollow body in relation to the connection elements remains electrically isolated.

By means of using the first and the second thread, axial compression forces and/or tensile forces, in particular on the connection element, may always be converted to compression forces on the threads.

The insulation-material extent may have three sub-regions, specifically two external regions which extend about the axis and which are positioned at the axial ends of a central region which extends about and along the axis and the surface area profile of which in a longitudinal section along the axis has at least two profiles which at least partially are radial in relation to the axis and which lend mechanical support and are electrically isolating.

The two external regions may extend in a substantially radial manner and mechanically support and electrically isolate surfaces of the hollow body and of the connection element that run in a substantially radial manner.

The insulation-material extent, radially between the first and the second thread, is fixable onto the first thread or second thread, and together with the insulation-material extent, or thereon, is screwable onto the other thread.

The insulation-material extent may be produced as a double-threaded body, the two thread turns of which are axially offset in relation to one another.

The insulation-material extent may be produced as a coating of the first thread and/or of the second thread.

The insulation-material extent may be fixable axially between the first and the second thread and radially between an outer intermediate element, which is composed of an electrically conducting material, and an inner intermediate element, which is composed of an electrically conducting material, which intermediate elements in each case extend about and along the axis, wherein the first thread may be screwable to a thread of the outer or inner intermediate element, and the second thread may be screwable to the thread of the other intermediate element. "Inner" and "outer" here refers to the axis A.

The outer intermediate element may extend axially beyond the insulation-material extent in the direction toward the hollow body or toward the connection element, and the inner intermediate element may extend axially beyond the insulation-material extent in the opposite direction, and the threads of the intermediate elements may be produced in the regions extending therebeyond.

The insulation-material extent, as an intermediate sleeve or as an intermediate plug, may plug-connect the outer intermediate element to the inner intermediate element.

The surface area profile of the central region in a longitudinal section along the axis may have at least two radial profiles producing at least one step.

The two external regions may be adhesively bonded to the central region by an adhesive, so as to be without defective spots and without air bubbles.

The first thread may be an external thread or an internal thread, and the second thread may be a corresponding mating thread. If the first thread is an external thread or an internal thread, and the second thread is a corresponding mating thread, this means that the second thread may be screwed to the first thread. If the first thread is an external thread, the second thread is an internal thread.

The threads of the outer and of the inner intermediate elements may be corresponding mating threads of the first thread and of the second thread.

At least one of the threads and/or the insulation-material extent, in order to avoid air pockets, may have a metallic coating.

The insulation-material extent may be composed of ceramics, polyether ether ketone (PEEK), perfluoroalkoxy (PFA), PDFA, Teflon™, or polytetrafluoroethylene (PTFE).

The hollow body may be a composite part of a tubular inductor, wherein the connection element is electrically connected to a capacitive assembly electrically isolated from the hollow body, which assembly at the second axial end of the hollow body may be electrically connected to a further connection element.

The further connection element of the hollow body may have the identically constructed connection to the hollow body as the connection element.

The connection element and the further connection element, on the axial ends thereof that face away from the hollow body, may in each case have one internal or external thread for screwing to a corresponding mating thread of an additional connection element of an additional hollow body.

Additional hollow bodies extending longitudinally along a respective axis by means of additional connection elements may be mechanically and electrically connectable to the two connection elements of the electrically isolating hollow body.

The additional connection elements and the additional hollow bodies thereof may be composed of an electrically conducting material and are electrically interconnectable such that the respective additional hollow body is not electrically isolated.

The hollow bodies may have capacitive assemblies and may be mechanically and electrically interdisposable in a series of interconnected additional hollow bodies.

All hollow bodies may be incorporated in a reservoir as respective housings of an inductive heating loop of a tubular inductor, in particular for oil sand production.

BRIEF DESCRIPTION OF THE DRAWINGS

These and other objects and advantages will become more apparent and more readily appreciated from the following description of the various embodiments, taken in conjunction with the accompanying drawings of which.

DETAILED DESCRIPTION OF THE PREFERRED EMBODIMENT

Figure 1:
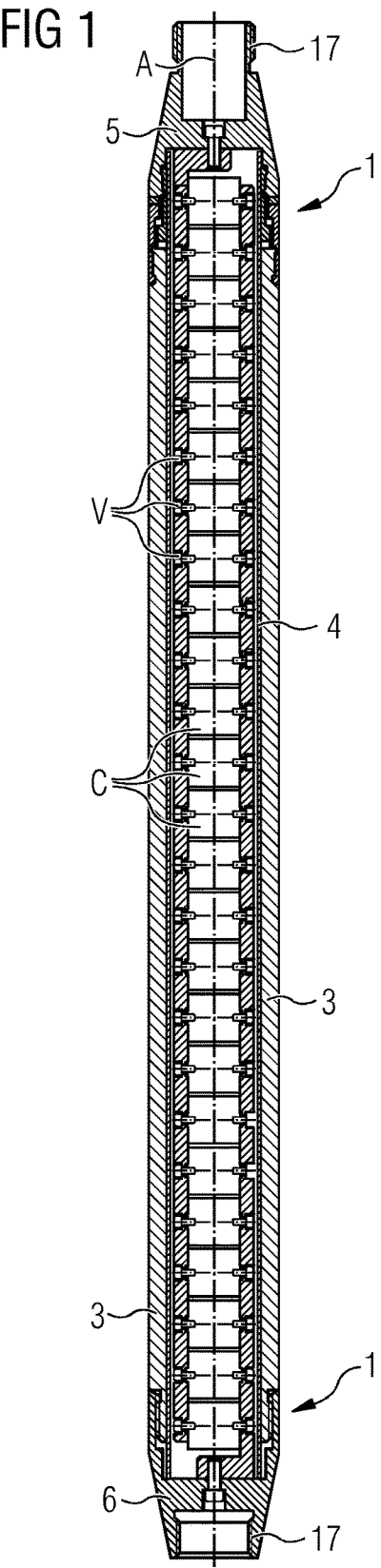
FIG. 1 is an embodiment of a hollow body.

Reference will now be made in detail to the various embodiments, examples of which are illustrated in the accompanying drawings, wherein like reference numerals refer to like elements throughout.

Figure 2:
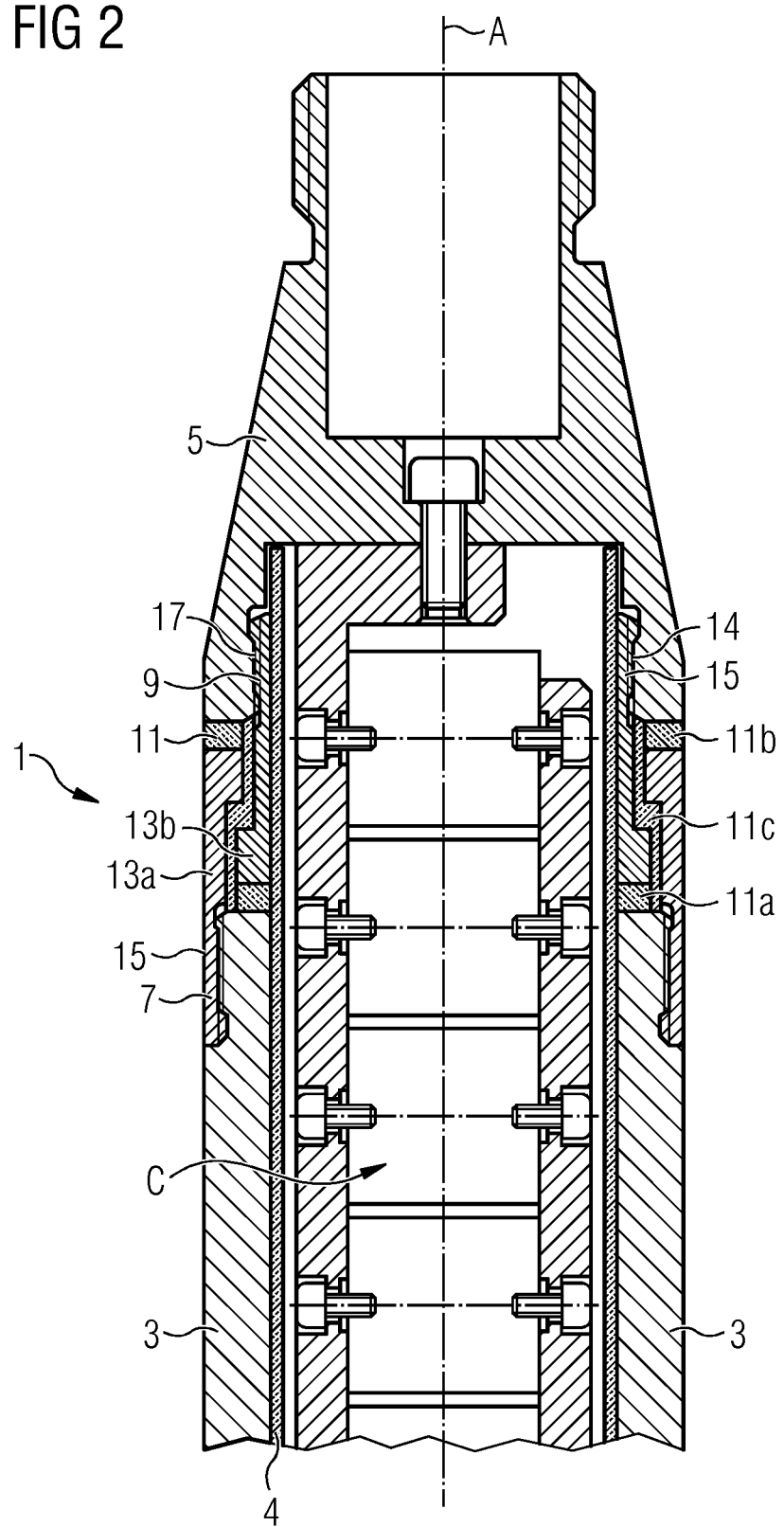
FIG. 2 is an embodiment of a connection.
Figure 3:
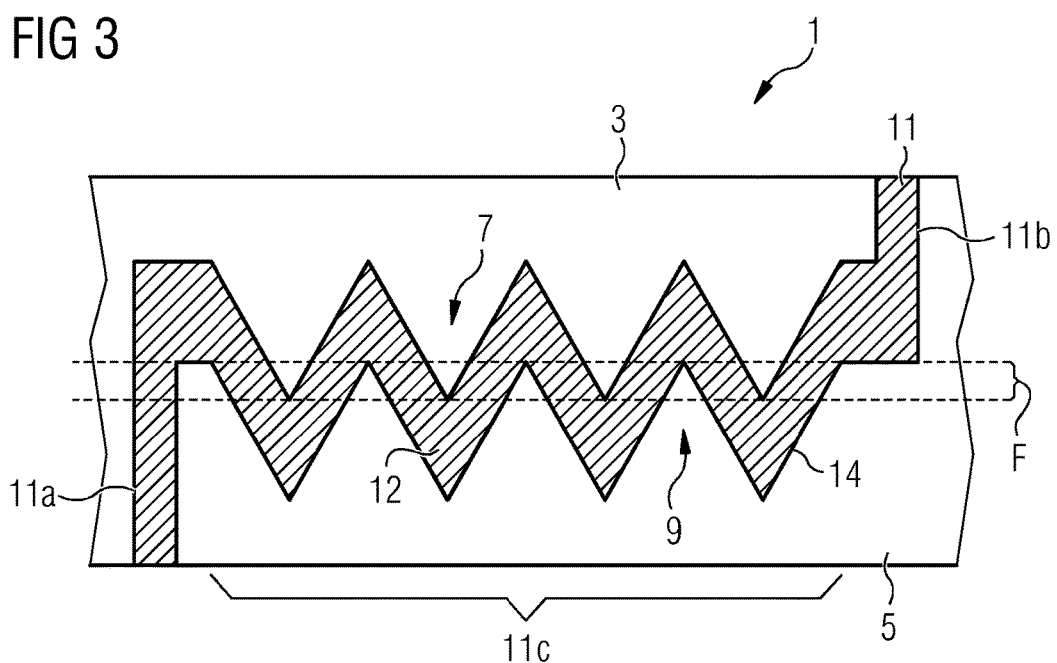
FIG. 3 is an embodiment of a connection.

FIG. 1 shows an embodiment of a hollow body 3. FIG. 1 shows the hollow body 3, which is composed of an electrically conducting material and extends longitudinally along an axis A, wherein the hollow body 3 may be a hollow cylinder and provide a housing of a tubular inductor. FIG. 1, in particular on the right side of the hollow body 3, shows a mechanical-load bearing and electrically isolating mechanical connection 1 of the hollow body 3 to a connection element 5, which is composed of an electrically conducting material and extends along the axis A. The connection element 5, at the axial end that faces away from the hollow body 3, displays an internal thread 17 for screwing to a corresponding mating thread of an additional connection element (not illustrated) of an additional hollow body (not illustrated). The hollow body 3 may be a component part of a tubular inductor, for example, wherein the connection element 5 is electrically connected to a capacitive component assembly C, which is electrically isolated in relation to the hollow body 3 and which at the second left-side axial end of the hollow body 3 is electrically connected to a further connection element 6. V indicates electrical connections between the individual capacitances C. The capacitances C, the electrical connections V thereof, or contacts, respectively, are electrically isolated in relation to the hollow body 3, specifically by an electrically isolating hollow body, for example, specifically the hollow cylinder 4, interdisposed between the hollow cylinder 3 and the capacitive component assembly C. On the left side of the hollow body 3 the further connection element 6 has an internal thread 17 for screwing to the corresponding mating thread of an additional connection element (not illustrated) of an additional hollow body (not illustrated) on the left side. In order for the hollow body 3 to be electrically isolated, the further connection element 6 of the hollow body 3 has the identically constructed connection 1 to the hollow body 3 as the connection element 5. The mechanical-load bearing and electrically isolating mechanical connection 1 at the right axial end of the elongate hollow body 3 has a first thread 7, which is produced so as to run about the axis A thereon and which mechanically supports a second thread 9, which is produced on the connection element 5 so as to run about the axis A, wherein an insulation-material extent 11 which is fixed between the first and the second thread 7 and 9, respectively, lends additional mechanical support and electrically isolates the hollow body 3 from the connection element 5. FIGS. 2 and 3 show two embodiments of a mechanical-load bearing and electrically isolating mechanical connection 1. FIG. 1 shows the use of the hollow body 3 as an inductor housing of a tubular inductor. The capacitances C which are connected in series or in parallel are accommodated in the inductor housing.

FIG. 2 shows an embodiment of a mechanical-load bearing and electrically isolating mechanical connection 1. The illustration according to FIG. 2 may be considered as a magnification of the right axial end of the hollow body 3 according to FIG. 1. An electrically isolating hollow cylinder 4 is disposed between the hollow cylinder 3 and the capacitive component assembly C. FIG. 2 shows that an insulation-material extent 11 is fixed axially between a first and a second thread 7 and 9, respectively, and radially between an outer intermediate element 13a, which is composed of an electrically conducting material, and an inner intermediate element 13b, which is composed of an electrically conducting material, which intermediate elements 13a, 13b in each case extend about and along the axis A. The first thread 7 is screwed to a thread of the outer intermediate element 13a. The second thread 9 is screwed to a thread of the inner intermediate element 13b. The insulation-material extent 11 has three sub-regions, specifically two external regions 11a and 11b, which extend about the axis A and which are fixed to the axial end of a central region 11c, which extends about and along the axis A and the surface area profile of which in a longitudinal section along the axis has at least two profiles which are at least partially radial in relation to the axis and which have a mechanical-load bearing and electrically isolating effect. This central region 11c may absorb compression forces and tensile forces along the axis A, which may always be converted to compression forces. The electrical isolation is always maintained here. The two external regions 11a and 11b run in a substantially radial manner and lend mechanical support and electrically isolate surfaces of the hollow body 3 and of the connection element 5 that run in a radial manner. The insulation-material extent 11 is designed as an intermediate sleeve which plug-connects the outer intermediate element 13a to the inner intermediate element 13b. The profile of the surface of the central region 11c in a longitudinal section along the axis A is step-like. Accordingly, mechanical compression forces and tensile forces may be absorbed and be converted to compression forces. The two external regions 11a and 11b may be adhesively bonded to the central region 11c by an adhesive, so as to be without defective spots and without air bubbles.

FIG. 2 shows that the outer intermediate element 13a extends axially beyond the insulation-material extent 11 in the direction toward the hollow body 3. According to FIG. 2, the inner intermediate element 13b extends axially beyond the insulation-material extent 11 in the direction toward the connection element 5. The threads of the intermediate elements 13a and 13b are in each case produced in the regions 15 extending therebeyond. The reference sign C identifies the capacitive elements, which are electrically connected to the electrically conducting connection element 5. The capacitances C are electrically isolated in relation to the hollow body 3. According to FIG. 2, the outer and the inner intermediate element 13a and 13b may be made as cylindrical aluminum parts which are connected by an insulation-material extent 11 acting as an intermediate sleeve in such a manner that the insulation-material extent 11 may be stressed only for compression or traction. In this way, a stable connection is achieved, as has could already be confirmed in experiments. Disadvantageously, the insulation-material extent 11 cannot be made in one part. In order for paths for current leakage and for partial discharges to be avoided, the various parts of the insulation-material extent 11, in particular the two external regions 11a and 11b, as well as the central region 11c, have to be adhesively bonded during installation. Furthermore, there must be no defective spots or air bubbles in the adhesive, as this would otherwise potentially lead to failure of the electrical isolation of the insulation-material extent 11. In order for air pockets to be avoided, in particular during adhesive bonding, the threads and/or the insulation-material extent 11 may have a metallic coating 14 or a plating.

FIG. 3 shows an embodiment of a mechanical-load bearing and electrically isolating mechanical connection 1. FIG. 3 may likewise be considered as a magnification of the right side of the hollow body 3 according to FIG. 1. According to this embodiment, an insulation-material extent 11 has been fixed radially between a first and a second thread 7 and 9, respectively, so as to be on the first thread 7, wherein the second thread 9 is then screwed to the insulation-material extent 11. In principle, screwing may similarly be performed in the reversed sequence. FIG. 3 shows that the insulation-material extent 11 is produced as an integral double-threaded body 12, the two thread turns of which are axially offset in relation to one another. In principle, the insulation-material extent 11 may alternatively also be produced as a coating of a respective first thread 7 and/or of a second thread 9. FIG. 3 also illustrates that the insulation-material extent 11 may have three sub-regions, specifically two external regions 11a and 11b, which extend about the axis A and which are positioned at the axial ends of a central region 11c, which extends about and along the axis A and the surface area profile of which in a longitudinal section along the axis has at least two profiles which are at least partially radial in relation to the axis A and which lend mechanical support and are electrically isolating. The mechanical-load bearing here relates to compression forces and tensile forces F which act along the axis A (not illustrated here). FIG. 3 shows that the two external regions 11a and 11b extend radially and mechanically support and electrically isolate surfaces of the hollow body 3 and of the connection element 5 that run in a radial manner. In order for air pockets to be avoided, in particular during adhesive bonding, the threads and/or the insulation-material extent 11 may have a metallic coating 14 or a plating. FIG. 3 shows that a connection 1 may be manufactured by a ceramic-coated thread 7 and/or 9 (suitable rather for comparatively low electrical voltages) or by way of a ceramic body which may be implemented as a double thread 12. In the case of the latter it is important that the thread runs are overlapping. Only in this way is it ensured that the ceramic part is always stressed for compression and thus also remains stable. Ceramic for high temperature or PEEK (polyether ether ketone) or PFA (perfluoroalkoxy) may be employed as materials. Comparatively small partial discharges or current leakages on account of defective spots or air pockets would not present any problems in the case of ceramics.

The embodiments according to FIGS. 1, 2, and 3 of hollow-cylindrical hollow bodies 3 may be mechanically and electrically interdisposed together with the mechanical-load bearing and electrically isolating connections 1 in a series of interconnected additional hollow bodies, wherein all hollow bodies may be incorporated as respective housings of an inductive heating loop of a tubular inductor, in particular for oil sand production, in a reservoir. In principle, the connections 1 may be used wherever housings are to be electrically isolated, and the internal parts thereof are to be electrically connected.

Figure 4:
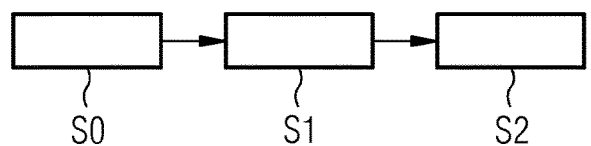
FIG. 4 is an embodiment of a method.

FIG. 4 shows an embodiment of a method. According to the method for a mechanical-load bearing and electrically isolating mechanical connection 1, in a S1 in each case one connection element 5, 6 is fixed to an axial end of a hollow body 3 which extends longitudinally along an axis A in such a manner that the connection 1 in relation to axial compression forces and/or tensile forces F remains mechanically stable and the hollow body 3 in relation to the connection elements 5, 6 remains electrically isolated.

Prior to S1, an electrically isolated and capacitive component assembly C is integrated in the hollow body 3 in S0. Subsequently, in S2, the hollow body 3 is mechanically and electrically interdisposed in a series of mechanically and electrically interconnected additional hollow bodies without capacitive component assemblies. As for the use of the device and the associated methods, specific reference is made to oil sand production, wherein frequencies in particular in the range of 10 kHz to 200 kHz are applied for the inductive heating.

The various embodiments have been described in detail with particular reference and examples, but it will be understood that variations and modifications can be effected within the spirit and scope of the various embodiments covered by the claims which may include the phrase "at least one of A, B and C" as an alternative expression that means one or more of A, B and C may be used, contrary to the holding in *Superguide* v. *DIRECTV*, 69 USPQ2d 1865 (Fed. Cir. 2004).

What is claimed is:

1. A mechanical-load bearing and electrically isolating mechanical connection, comprising:
    a hollow body composed of an electrically conducting material and extending longitudinally along an axis;
    a connection element composed of an electrically conducting material and extending along the axis;
    a first thread provided on the hollow body at the one axial end and running about the axis;
    a second thread provided on the connection element and running about the axis;
    an outer intermediate element composed of an electrically conducting material and an inner intermediate element composed of an electrically conducting material, the outer intermediate element and inner intermediate element overlapping each other in an area axially between the hollow body and the connection element;
    wherein the first thread provided on the hollow body is screwable to a thread of one of the outer intermediate element and the inner intermediate element, and the second thread provided on the connection element is screwable to a thread of the other of the outer intermediate element and the intermediate element;
    an insulation-material extent fixed radially between the outer intermediate element and inner intermediate element in the area axially between the hollow body and the connection element, the insulation-material extent electrically isolating the hollow body from the connection element.

2. The mechanical-load bearing and electrically isolating mechanical connection as claimed in claim 1, wherein the insulation-material extent includes:
    (a) a central region sandwiched radially between the outer intermediate element and inner intermediate element;
    (b) a first axial region arranged axially between the hollow body and one of the outer intermediate element and the inner intermediate element; and
    (c) a second axial region arranged axially between the connection element and the other of the outer intermediate element and the inner intermediate element.

3. The mechanical-load bearing and electrically isolating mechanical connection as claimed in claim 2, wherein the two external regions extend substantially radially and mechanically support and electrically isolate surfaces of the hollow body and surfaces of the connection element that run substantially radially to one another.

4. The mechanical-load bearing and electrically isolating mechanical connection as claimed in claim 1, wherein the outer intermediate element extends axially beyond the insulation-material extent in a direction toward the hollow body or toward the connection element, and the inner intermediate element extends axially beyond the insulation-material extent in a direction opposite to the direction the outer intermediate element extends, and the thread of the outer intermediate element and the thread of the inner intermediate element are provided in regions extending axially beyond a region in which the outer intermediate element and the inner intermediate element radially overlap.

5. The mechanical-load bearing and electrically isolating mechanical connection as claimed in claim 1, wherein the insulation-material extent plug-connects the outer intermediate element to the inner intermediate element.

6. The mechanical-load bearing and electrically isolating mechanical connection as claimed in claim 1, wherein the central region of the insulation-material extent has at least two radial surface area profiles that define at least one step.

7. The mechanical-load bearing and electrically isolating mechanical connection as claimed in claim 1, wherein the first and second axial regions of the insulation-material extent are adhesively bonded to the central region of the insulation-material extent by an adhesive.

8. The mechanical-load bearing and electrically isolating mechanical connection as claimed in claim 1, wherein the first thread is an external thread or an internal thread, and the second thread is a corresponding mating thread of the first thread.

9. The mechanical-load bearing and electrically isolating mechanical connection as claimed in claim 8, wherein the thread of the outer intermediate element is a corresponding mating thread with the first thread and the thread of the inner intermediate element is a corresponding mating thread of the second thread.

10. The mechanical-load bearing and electrically isolating mechanical connection as claimed in claim 1, wherein at least one of the first thread, the second thread, the thread of the outer intermediate element, the thread of the inner intermediate element, and the insulation material extent has a metallic coating or a plating.

11. The mechanical-load bearing and electrically isolating mechanical connection as claimed in clam 1, wherein the insulation-material extent is composed of ceramics, polyether ether ketone, perfluoroalkoxy, or polytetrafluoroethylene.

12. A mechanical-load bearing and electrically isolating mechanical connection, comprising:
a hollow body composed of an electrically conducting material and extending longitudinally along an axis;
a connection element composed of an electrically conducting material and extending along the axis and connecting to the hollow body at one axial end of the hollow body;
a first thread provided on the hollow body at the one axial end and running about the axis;
a second thread provided on the connection element and running about the axis, the second thread being mechanically supported by the first thread; and
an insulation-material extent fixed between the first thread and the second thread and electrically isolating the hollow body from the connection element;
wherein the hollow body is a component part of a tubular inductor, the connection element is electrically connected to a capacitive component assembly electrically isolated from the hollow body, and the capacitive component assembly is electrically connected to another connection element at a second axial end of the hollow body.

13. The mechanical-load bearing and electrically isolating mechanical connection as claimed in claim 12, wherein the other connection element is connected to the hollow body identically as the connection element.

14. The mechanical-load bearing and electrically isolating mechanical connection as claimed in claim 12, wherein the connection element and the other connection element each have one internal thread or external thread configured to screw to a corresponding mating thread of an additional connection element of another hollow body.

15. A method for connecting a hollow body extending longitudinally along an axis to a connection element extending along the axis, the method comprising: fixing the connection element to an axial end of the hollow body such that axial compression forces and axial tensile forces remain mechanically stable and that the hollow body remains electrically isolated from the connection element,
wherein the hollow body includes one or more capacitive assemblies integrated therein and electrically isolated from the hollow body, the hollow body being mechanically and electrically interdisposed in a series of mechanically and electrically interconnected additional hollow bodies without capacitive assemblies.

16. The method as claimed in claim 15, wherein one of the additional hollow bodies extends longitudinally along the axis and is mechanically and electrically directly or indirectly connected to the connection element by another connection element.

17. The method as claimed in claim 16, wherein the other connection element and the additional hollow bodies are composed of an electrically conducting material and are electrically interconnected.

18. The method as claimed in claim 17, wherein all of the hollow bodies are incorporated in a reservoir as respective housings of an inductive heating loop of a tubular inductor.

19. A mechanical-load bearing and electrically isolating mechanical connection, comprising:
a hollow body composed of an electrically conducting material and extending axially along a longitudinal axis;
a connection element composed of an electrically conducting material and extending along the longitudinal axis and connecting to the hollow body at one axial end of the hollow body;
a first thread provided on the hollow body at the one axial end and extending about the longitudinal axis;
a second thread provided on the connection element and extending about the longitudinal axis, the second thread overlapping the first thread along the longitudinal axis and being mechanically supported by the first thread; and
an insulation-material extent fixed directly between the first thread and the second thread and electrically isolating the hollow body from the connection element;
wherein the insulation-material extent includes:
(a) a central region sandwiched radially between the first thread provided on the hollow body and the second thread provided on the connection element;
(b) a first axial region extending from a first axial end of the central region of the insulation-material extent in a radially outward direction, and sandwiched axially between an axial end surface of the hollow body and an opposing surface of the connection element; and
(c) a second axial region extending from a second axial end of the central region of the insulation-material extent in a radially inward direction, and sandwiched axially between an axial end surface of the connection element and an opposing surface of the hollow body.

20. The mechanical-load bearing and electrically isolating mechanical connection as claimed in claim 19, wherein the insulation-material extent is fixed onto one of the first thread and the second thread, and is screwable onto the other of the first thread and the second thread.

21. The mechanical-load bearing and electrically isolating mechanical connection as claimed in claim 20, wherein the insulation-material extent is a double-threaded body having two thread turns axially offset in relation to one another.

22. The mechanical-load bearing and electrically isolating mechanical connection as claimed in claim 20, wherein the insulation-material extent is a coating of the first thread and/or a coating of the second thread.

* * * * *